(12) United States Patent
McElveen, Jr. et al.

(10) Patent No.: US 11,545,882 B2
(45) Date of Patent: Jan. 3, 2023

(54) ELECTRIC MOTOR WITH SELECTIVE FLUX STATOR

(71) Applicant: ABB Schweiz AG, Baden (CH)

(72) Inventors: Robert F. McElveen, Jr., Anderson, SC (US); Richard J. Budzynski, Simpsonville, SC (US); Jukka T. Jarvinen, Greenville, SC (US)

(73) Assignee: ABB Schweiz AG, Baden (CH)

( * ) Notice: Subject to any disclaimer, the term of this patent is extended or adjusted under 35 U.S.C. 154(b) by 48 days.

(21) Appl. No.: 16/986,532

(22) Filed: Aug. 6, 2020

(65) Prior Publication Data

US 2022/0045586 A1    Feb. 10, 2022

(51) Int. Cl.
| | |
|---|---|
| *H02K 19/10* | (2006.01) |
| *H02K 3/28* | (2006.01) |
| *H02K 21/02* | (2006.01) |
| *H02K 21/12* | (2006.01) |
| *H02P 1/46* | (2006.01) |
| *H02P 25/18* | (2006.01) |
| *H02K 1/12* | (2006.01) |

(52) U.S. Cl.
CPC ............... *H02K 19/10* (2013.01); *H02K 3/28* (2013.01); *H02K 21/021* (2013.01); *H02K 21/125* (2013.01); *H02P 1/46* (2013.01); *H02P 25/18* (2013.01); *H02K 1/12* (2013.01)

(58) Field of Classification Search
CPC ........ H02K 19/10; H02K 3/28; H02K 21/021; H02K 21/125; H02K 1/12; H02K 1/276; H02K 2213/09; H02K 21/46; H02K 1/16; H02K 1/2706; H02K 3/12; H02K 3/48; H02K 21/10; H02K 1/165; H02K 3/50; H02K 1/27; H02K 21/14; H02P 25/18; H02P 25/16; H02P 1/46
USPC .......................................................... 310/71
See application file for complete search history.

(56) References Cited

U.S. PATENT DOCUMENTS

| | | | |
|---|---|---|---|
| 4,139,790 A | * | 2/1979 | Steen ..................... H02K 21/46 310/212 |
| 5,142,213 A | | 8/1992 | Stelter |

(Continued)

OTHER PUBLICATIONS

Aliabad et al., "Line-Start Permanent-Magnet Motors: Significant Improvements in Starting Torque, Synchronization, and Steady-State Performance," *IEEE Transactions on Magnetics*, 46(12): 4066-4072 (Dec. 2010).

(Continued)

*Primary Examiner* — Ahmed Elnakib
(74) *Attorney, Agent, or Firm* — Leydig, Voit & Mayer, Ltd.

(57) ABSTRACT

A synchronous electrical motor, which may operate polyphase electrical power, is configured to operate at a rated flux configuration and a high flux configuration. To enable the high flux configuration, some coils wound about the stator of the electric motor can be designated bypass coils and can be selectively disconnected from the power source supplying the motor with electrical power. The remaining permanent coils continue to receive full line power and generate a rotating magnetic field with an increased magnetic flux. At startup from standstill conditions, the bypass coils are selectively disconnected so that a flux boost occurs and a corresponding increase in output torque of the electric motor.

20 Claims, 7 Drawing Sheets

(56) References Cited

U.S. PATENT DOCUMENTS

| | | | | |
|---|---|---|---|---|
| 5,177,423 | A | * | 1/1993 | Nakamura .............. H02P 25/18 318/767 |
| 5,425,165 | A | * | 6/1995 | Shramo .............. H02K 15/0471 29/598 |
| 6,768,411 | B2 | | 7/2004 | Luttrell |
| 10,917,030 | B1 | * | 2/2021 | Hao ......................... H02K 3/28 |
| 2007/0096571 | A1 | * | 5/2007 | Yuratich .................. H02K 9/00 310/90 |
| 2011/0057597 | A1 | * | 3/2011 | Bosch .................... H02P 25/18 318/497 |
| 2013/0127391 | A1 | * | 5/2013 | Lewis .................... H02P 25/18 318/498 |
| 2013/0221791 | A1 | * | 8/2013 | Tomohara .............. H02P 25/18 310/198 |
| 2014/0210297 | A1 | | 7/2014 | Shizu |
| 2017/0133968 | A1 | * | 5/2017 | Takahashi .............. H02K 3/345 |
| 2020/0072244 | A1 | | 3/2020 | Baumann et al. |

OTHER PUBLICATIONS

Ferreira et al., "Comparison of Different Tapped Windings for Flux Adjustment in induction Motors," *IEEE Transactions on Energy Conversion*, 29(2): 375-391 (Jun. 2014).

Miller, "Synchronization of Line-Start Permanent-Magnet AC Motors." *IEEE Transactions on Power Apparatus and Systems*, PAS-103(7): 1822-1828 (Jul. 1984).

Rabbi et al., "Analysis of Starting and Synchronization Process for Line Start IPM Motors," *2012 7th International Conference on Electrical and Computer Engineering*, IEEE, 311-314 (Dec. 20-22, 2012).

Rabbi et al., "Critical Criteria for Successful Synchronization of Line-Start IPM Motors," *IEEE Journal of Emerging and Selected Topics in Power Electronics*, 2(2): 348-358 (Jun. 2013).

Zili et al., "Research on a Novel Wye-delta Soft Start Method of Three-Phase Induction Motor," *Proceedings of The 7th International Power Electronics and Motion Control Conference*, IEEE, 5 pp. (Jun. 2-5, 2012).

* cited by examiner

ELECTRIC MOTOR WITH SELECTIVE FLUX STATOR

BACKGROUND

Electric motors are devices that convert electricity into a motive mechanical force output as torque associated with a rotating motor shaft. Electric motors operate on various operating principles and can utilize different types of electrical power. One example is an alternating current synchronous electric motor that receives alternating current from a suitable power source. The alternating current is conductively directed through a plurality of conductive windings or coils disposed circumferentially about the stator of the electric motor. Conduction of the alternating current in the windings generate a magnetic field or flux that can electromagnetically interact with the rotor rotatably disposed in and concentrically surrounded by the stator. The periodic or wavelike nature of the alternating current causes the magnetic field produced by the stator windings to concentrically rotate about the stator which the rotor will tend to follow.

A characteristic of synchronous electric motors is that the rotational speed of the rotor locks in synchronization with the frequency of the alternating current conducted through the stator windings. Synchronization causes the rotor to rotate at the same speed as the revolving magnetic field. The speed that the magnetic field rotates around the stator and the locked rotational speed of the rotor is referred to as synchronous speed. One disadvantage of synchronous motors, such as line start permanent magnet motors or cage rotor permanent magnet motors, is that at startup they must be promptly brought to and maintained at synchronous speed and therefore may include additional starting devices or circuit configurations. Synchronous electric motors of the foregoing types may therefore be unsuitable for high inertial load conditions such as rotating industrial fans, blowers or pumps that require large amounts of synchronizing energy at startup. The present disclosure is directed to a stator winding configuration for an alternating current synchronous electric motor particularly suited to start under high inertial load conditions.

BRIEF SUMMARY

The disclosure provides an electric motor that may be a synchronous motor adapted to operate on poly-phase electrical power. The electric motor can include a rotor with a motor shaft rotatably and concentrically accommodated in a fixed stator having a plurality of stator teeth and alternating stator slots disposed radially in the concentric inner surface of the stator. To initiate motion from standstill of a high inertia load to which the electric motor may be coupled, the electric motor can operate at a rated flux configuration or a high flux configuration. In high flux operation, the coils made from conductive magnet wire that is wound about the stator teeth can produce a rotating magnetic field having an increased magnitude of magnetic flux as compared to operation during the rated flux configuration. To switch between the rated flux configuration and the high flux configuration, some of the coils may be designated as permanent coils that continuously receive full line power from the power source and other coils may be designated as bypass coils that can be selectively disconnected from the power source during startup. Decreasing the number of coils also reduces the number of effective turns in the electric motor that receive full line power, the number of effective turns being inversely proportional to the magnetic flux generated by the remaining permanent coils and their associated effective turns, which creates a flux boost and increasing the output torque of the motor. After the electric motor has reached synchronous speed, the bypass coils may be reconnected to the power source and the motor returns to the rated flux configuration.

A possible advantage of the disclosure is that the synchronous motor, such as a line start permanent magnet motor or caged rotor permanent magnet motor, is better able to achieve synchronous speed, speed while coupled to a high inertia load without the inclusion of additional drives or circuitry. Another possible advantage is that the synchronous motor is capable of replicating the startup capabilities of induction motors, enabling their use in high inertia applications like industrial fans and pumps. These and other possible advantages and features will be apparent from the following detailed description and accompanying drawings.

DETAILED DESCRIPTION

Figure 1:
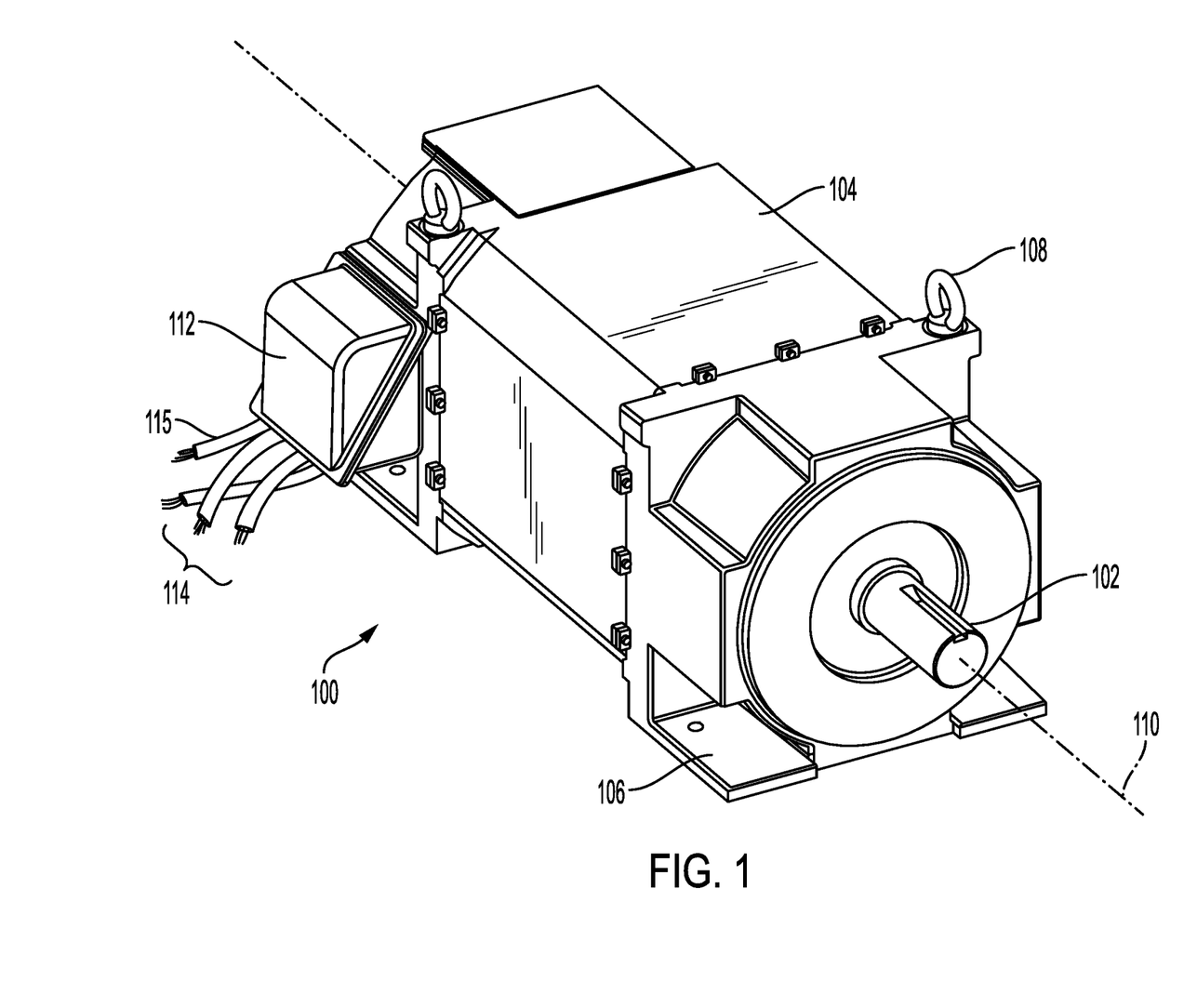
FIG. 1 is a perspective view of an electric motor delineating a rotational axis and configured for alternating current synchronous operation.

Now referring to the drawings, wherein like reference numbers refer to like elements, there is illustrated an example of a rotating electrical machine and particularly an electric motor 100 for converting electrical energy to a mechanical force in the form of torque that may be transmitted via a rotating motor shaft 102. The motor shaft 102 protrudes from the forward end of a motor enclosure 104 that encloses and houses the internal operating components of the electric motor 100. The motor enclosure 104 may be made from any suitable structural material such as cast iron, steel, aluminum or other suitable materials, and the enclosure may be configured according to common or standardized frame sizes that determine the location and arrangement of mounting features, such as mounting feet 106 and/or eyehooks 108. Further, the motor enclosure 104 can be designated in accordance with any of serval enclosure types, such as open drip proof (ODP) or totally enclosed fan cooled (TEFC) that determine how the electric motor 100 is constructed to interact with the operating environment to provide for cooling and protect the internal components against contaminants like moisture and dust. For reference purposes, the motor shaft 102 is supported to rotate with respect to and defines a rotational axis 110 of the electric motor 100.

To receive electric current from an external power source, the electric motor 100 can include a conduit box or terminal box 112 located at an appropriate location on the motor enclosure 104 from which extends a plurality of power leads 114 such as insulated conductive wires. The power leads 114 can be electrically connected to and complete a circuit with the external power source that provides electricity of the appropriate electrical characteristics and properties for operation of the electric motor 100. For example, the electric motor 100 can be configured to operate on poly-phase, alternating current power source. In a poly-phase power system, the plurality of power leads 114 will each conduct alternating current electricity of the same frequency and voltage to the electric motor, but the alternating current conducted in each power lead will be out of phase with that in the other power leads. Accordingly, the cyclic oscillations between 0°-360° of alternating current in each power lead 114 will be delayed or advanced with respect to that in the other power leads. By way of example, a three-phase electric motor 100 can include three power leads 114 that conduct alternating currents that are 120° out of phase with each other and a fourth neutral or ground lead 115 that may be connected to an electrical ground, for example, the motor frame, and that serves as a reference. However, while aspects of the disclosure may be described with respect to poly-phase alternating current power systems, aspects of the disclosure will also be applicable to other types of power systems and motor configurations.

Figure 2:
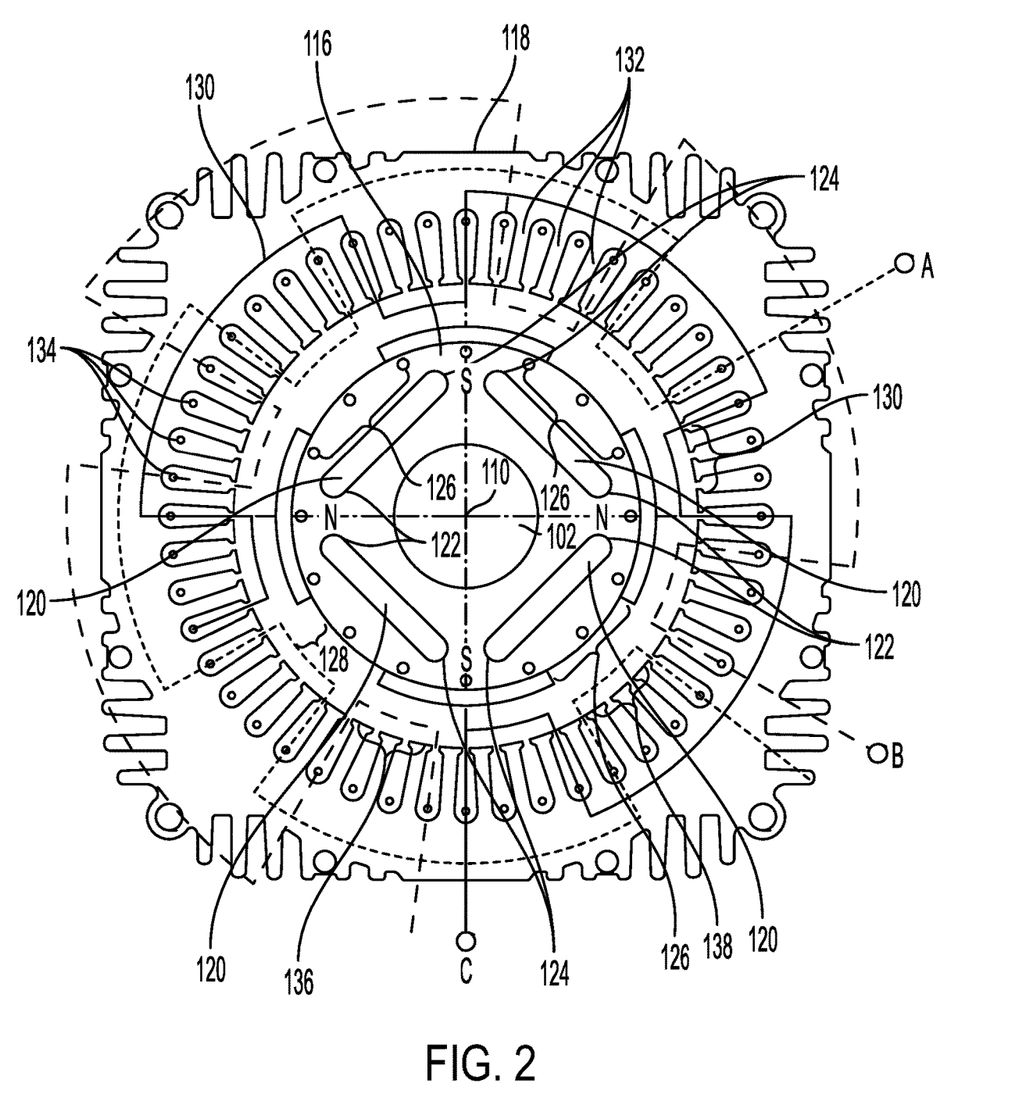
FIG. 2 is a schematic representation of a stator of the electric motor having a plurality of concentrically arranged teeth alternating with a plurality of stator slots accommodating a plurality of coils and configured for operation on poly-phased alternating current.

Referring to FIG. 2, to actuate rotation of the motor shaft 102, a rotor 116 that is generally cylindrical in shape is assembled about the extension of the shaft that is located within the enclosure 104 and is configured to electromagnetically interact with an annular stator 118 in which the rotor is disposed. The cylindrical rotor 116 and the annular stator 118 are concentrically aligned with the rotational axis 110 of the electric motor 100 defined by the motor shaft 102. To impart the electromagnetic characteristics to the rotor 116, the rotor can include one or more permanent magnets 120 that are embedded in the magnetically permeable body of the rotor. Each permanent magnet 120 has a north pole 122 and a south pole 124 and can be arranged so that the poles are proximate the cylindrical surface of the rotor 116. In an example, the permanent magnets 120 may be offset with respect to the rotational axis 110 and disposed in the rotor 116 as cords so that the north and south poles 122, 124 circumferentially alternate positions about the cylindrical surface of the rotor body, however, other arrangements of the permanent magnets are contemplated. The permanent magnets 120 are responsive to a magnetic field that may be generated by the stator and the north and south poles 122, 124 will follow the opposite polarities of the magnetic field as it circumferentially travels around the annular stator 118, thereby causing the rotor 116 and the motor shaft 102 to which it is attached to rotate. To allow rotation with respect to the motor enclosure 104, the motor shaft 102 may be rotatably supported on bearings that are fixedly mounted to the enclosure. To increase the electromagnetic interaction, the permanent magnets 120 may extend the axial length of the rotor 116.

To improve electromagnetic interaction with the generated magnetic field, the rotor 116 may be a caged rotor permanent magnet ("CRPM") type in which an inductive rotor cage 126 is embedded in the rotor body. The inductive rotor cage 126 can be in the form of a cage having a plurality of longitudinal conductive bars made from, for example, copper or aluminum that extend generally parallel with the rotational axis 110 and are circumferentially disposed around the cylindrical surface of the rotor body. The conductive bars are electrically connected at the axial ends of the rotor 116 by conductive rings. When the rotating magnetic field penetrates the rotor 116, the field may cut across the conductive bars and generate a magnetic counter-field due to Faraday's law. The induced counter-field will tend to follow the stator field, further motivating rotation of the rotor 116. The rotor cage 126 can therefore assist in starting the electric motor 100 from a standstill or locked rotor condition. In other examples, the rotor 116 can include conductive windings that receive an excitation current through brushes and function as electromagnets to generate the counter-field.

The annular stator 118 can be fixedly disposed concentrically around the rotor 116 and can be spaced apart and separated therefrom by an annular air gap 128. The stator 118 includes a stator core 130 that can be made from a magnetically permeable material such as iron or steel. In a conventional design, the stator core 130 can be made from a plurality of annularly shaped core laminations that are axially arranged as a stack and extend coaxially along the rotational axis 110. The stator core 130 may be fixed to and enclosed in the motor enclosure 104, which may include fins and the like to promote cooling.

To accommodate the conductive windings that conduct current to generate the electromagnetic field, the stator core 130 can include a plurality of stator teeth 132 that are radially arranged in the circumferential direction around the rotational axis 110 and circumferentially separated from each other by stator slots 134 radially disposed into the inner cylindrical surface of the stator core 130. Hence, between each two adjacent stator teeth 132 there is disposed a stator slot 134 so that the teeth and slots circumferentially alternate about the inner cylindrical surface of the stator core 130. The alternating stator teeth 132 and stator slots 134 may axially extend along the axial length of the stator core 130 with respect to the rotational axis 110.

The conductive windings can be elongated wires of copper or other conductive material that are wound or looped about the stator teeth 132 and accommodated in the stator slots 134. The conductive windings may be wound around a stator tooth 132 or a plurality of stator teeth 132 a number of successive times, each time being referred to as a "turn." The total number of turns of the conducting winding about the same stator tooth or stator teeth 132 forms a "coil." For example, a coil may be formed from three, four, or five turns of the conductive winding. The conductive wires of the conductive winding may then be directed around additional stator teeth 132 that are concentrically spaced from the initial coil in a continuous manner until the conductive windings circumscribe the inner circumference of the stator core 130. The path and geometry of the conductive windings around the stator core 130 can be referred to as the "winding pattern," and the winding pattern can take various arrangements and may determine the electrical characteristics and operating principles of the electric motor 100.

For example, the winding pattern may assign or allocate the coils by phases 136 and by pole-phase groups 138. Referring to FIG. 2, the phases 136 may include the coils that are electrically connected in series to the same electrical phase of the poly-phase power source. For example, referring to FIG. 3, in a three-phase power system, for the electrical motor 100 to receive three-phase power, a first phase conductor 140 may be associated with "A" phase current, a second phase conductor 142 may be associated with "B" phase current, and a third phase conductor 144 may be associated with "C" phase current. The phase conductors 140, 142, 144 may be electrically connected with the power leads 114 described with respect to FIG. 1. For reference, "A" phase conductive paths can be represented by short dashed lines, "B" phase conductive paths represented by longer dashed lines, and the "C" phase conductive paths represented by solid lines. The series of coils that are electrically connected to a respective one of the first, second, and third phase conductors 140, 142, 144 is referred to as a phase 136. The number of coils included with each phase 136 is dependent upon the number of stator teeth 132 and stator slots 134. In the example of a large electrical motor 100 of the disclosure, the stator core 130 may include forty-eight stator teeth 132 separated by forty-eight stator slots 134, such that each phase 136 includes sixteen coils (48 coils÷3 phase=16 coils/phase).

The coils may also be associated with a plurality of pole-phase groups 138, referred to herein as phase groups, with each phase group providing a single electromagnetic pole of a single phase. A pair of phase groups 138 associated with the north and south poles of a magnetic field can be located on diametrically opposite sides of the inner circumferential surface of the stator core 130. In the example of a three-phase, four pole electric motor 100 with forty-eight coils disposed about the stator 118, the electric motor 100 will include 12 phase groups 138 (48 coils÷(4 poles)=12 phase groups) with each phase group further including 4 coils. In FIG. 2, each of the twelve phase groups 138 is represented as an arc of the conductive winding with each arc spanning adjacent stator teeth 132.

In operation, when the first, second, and third phase conductors 140, 142, 144 are energized from a three phase power system with alternating electric current that is 120° degrees out of phase by the respective conductor, the current flowing in the plurality of phases 136 generates a magnetic field of changing polarity that circumferentially rotates around the rotational axis 110. As the polarity of one phase 136 connected to the first conductor 140 begins to change, e.g., from north to south, due to the periodic reversal of the direction of the alternating current associated with phase "A", the polarity of the adjacent phase 136 will become stronger because it is connected to the second or third phase conductor 142, 144 carrying current 120° degrees out of phase with the first conductor 130. The north and second magnetic poles 122, 124 of the permanent magnets 120 disposed in the rotor 116 are magnetically attracted to the opposite polarity associated with the magnetic field generated by the plurality the coils included with each of the phases 136 and will follow that polarity as it moves from one phase to an adjacent phase. The rotor 116 is thus caused to rotate with respect to the rotational axis 110.

The electric motor 100 can be a synchronous motor such that rotational speed of the rotor 116 is locked in synchronization with the frequency of the alternating current supplied to each of the three phase conductors 140, 142, 144. As explained, a synchronous motor may be difficult to start in high inertia applications where the motor shaft 102 is coupled to a large or heavy load requiring significant torque to achieve synchronization with rotating magnetic field. Inertia is the characteristic of an object at rest to remain at rest and resist undergoing movement, and torque is the applied rotational force required to turn an object. Because of this, synchronous motors often require special starting devices or circuits, and often cannot be used in direct online ("DOL") applications or line start applications. In a DOL application, the full line power including the full line voltage of the power source is immediately applied to the motor windings associated with the stator 118 to generate the magnetic field. Under locked rotor (or zero speed) conditions, due to resistance of the rotor 116 to reach synchronous speed with the magnetic field, the inrush current drawn by the motor windings will increase. Because DOL configurations often include a circuit breaker or the like between the electric motor 100 and the power source, the circuit breaker may trip, stopping the electric motor 100.

Therefore, to facilitate starting an alternating current synchronous electric motor 100 under high inertia loads, the winding pattern is arranged so the at least one of the phases 136 includes one or more permanent coils and at least one bypass coil. For example, referring to FIG. 3, there is illustrated an exemplary phase 136 that includes both permanent coils 150 and bypass coils 152. In the example provided above, where the stator core 130 includes forty-eight coils, the phase 136 associated with one of first, second, or third phase conductors 140, 142, 144 includes sixteen total coils which may be allocated among twelve permanent coils 150 and four bypass coils 152. The permanent coils 150 are arranged so that they are permanently connected to one of the first, second, and third phase conductors 140, 142, 144 to constantly provide full line power, including the full line voltage and current, to the permanent coils 150 while the motor power switch is on and the electric motor 100 is connected to the power supply.

Figure 3:
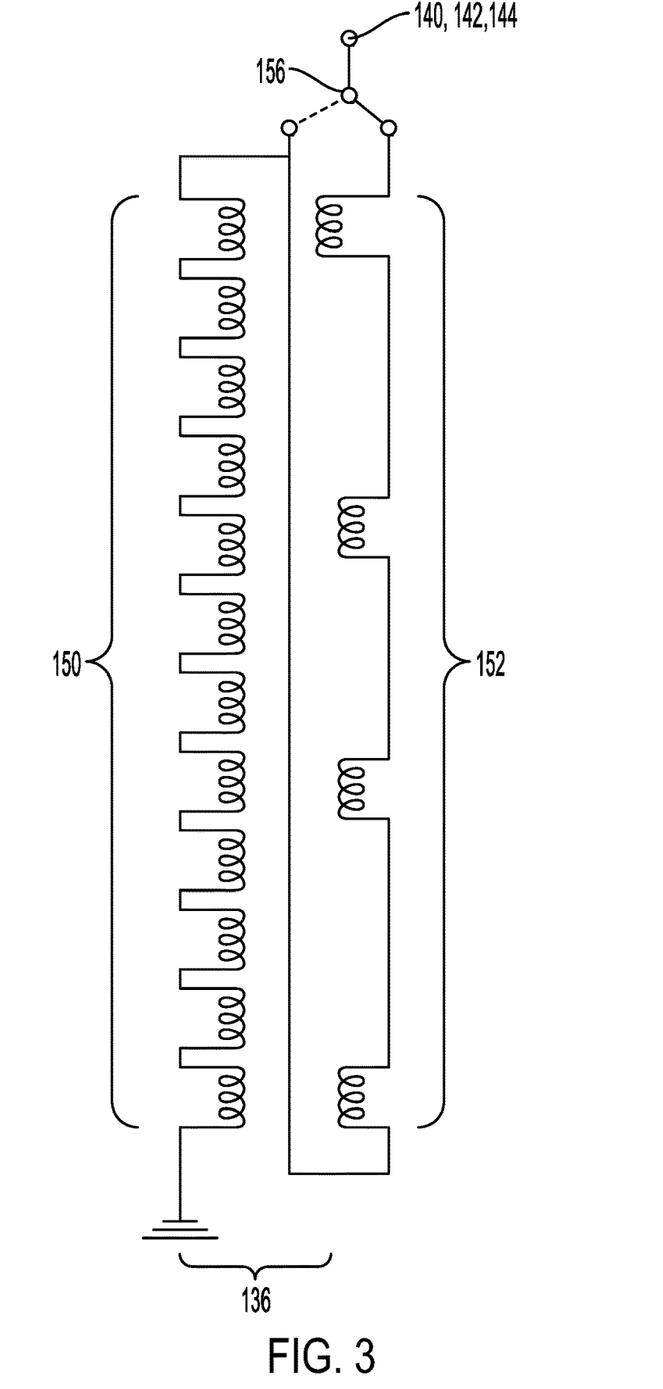
FIG. 3 is a schematic representation of a possible selectively reconfigurable arrangement of coils in a phase. to alternatively produce a high flux state and a rated flux state in accordance with the disclosure.

Under typical operating conditions, for example, when the electric motor 100 is operating at synchronous speed, the bypass coils 152 may also be conductively connected with the respective one of the first, second, and third phase conductor 140, 142, 144 to receive full line power. Because the full line power is provided to all permanent and bypass coils 150, 152 connected in series of each phase 136, the coils receive the same electrical current and generate magnetic fields of equal magnetic flux, in what may be referred as a "normal" or "rated" flux configuration of the electric motor 100 in which the electric motor is operated at its rated or designed operating parameters. This configuration may also be referred to as the low flux configuration due to the respectively low magnetic flux generated by the plurality of permanent and bypass coils 150, 152.

The bypass coils 152, however, may be electrically disconnected from the full line power conducted in the respective first, second, or third phase conductors 140, 142, 144 at selective times so that the bypass coils are not conducting alternating current or power. The bypass coils 152 are effectively removed from the series connections of the phase 136 and only the permanent coils 150 receive full line power from the power source, and the change in the conductive path concentrates the applied alternating current in the permanent coils 150. Because the magnetic flux generated per phase 136 and per phase group 138 varies inversely with the number of coils connected in series and the number of effective turns per coil, reducing the total number of coils increases the magnitude of the generated magnetic flux. This results in a high flux configuration of the electric motor where the permanent coils 150 of the phase 136 that remain connected in series generate a magnetic field of a higher or increased magnetic flux or magnitude with respect to the rated flux configuration described above. The high flux configuration thus results in a flux boost in which the magnitude of the magnetic flux generated by the stator 118 and that attracts the permanent magnets 120 disposed in the rotor 116 is stronger. Because the mechanical torque generated by the electric motor 100 is proportional to the square of the magnetic flux applied to the rotor 116, bypassing the bypass coils 152 to increase alternating current directed to the permanent coils 150 and the magnitude of the magnetic flux generated by the permanent coils thus increases the torque output by the electric motor to move and synchronize the high inertia load.

To selectively connect and disconnect the bypass coils 152 from the respective one of the first, second, or third phase conductors 140, 142, 144 and the permanent coils 150, the phases 136 may include or be connected to the conductors via a switching device 156. The switching device 156 can be any suitable switching device for interrupting or diverting electrical current from one conductive path to another such as, for example, a relay switch or a solid state device. In the illustrated example, the bypass coils 152 can be proximately connected to the respective one of the first, second, or third phase conductors 140, 142, 144 and the permanent coils 150 can be thereafter connected in series with the bypass coils 152. Accordingly, under the rated flux configuration, the switching device 156 is set so that both the bypass coils 152 and the permanent coils 150 receive full line power. This setting for the switching device 156 is indicated by the solid line connection.

Under the high flux configuration, however, the switching device 156 can be activated to "tap" directly to the permanent coils 150, placing them in direct electrical connection with the respective one of the first, second, or third phase conductors 140, 142, 144 and bypassing or cutting out the bypass coils 152 which are electrically isolated from the power source to the electric motor 100. This setting for the switching device 156 is indicated by the dashed line connection. As explained above, under this high flux configuration, only the permanent coils 150 receive full line current and accordingly generate magnetic fields of increased magnitude. To restore the rated flux configuration, the switching device 156 can be reconfigured from the tapped position to directly connect with the bypass coils 152.

The switching device 156 may be incorporated within the enclosure of the electric motor 100 or may be located externally of the motor. In the example of an external switching device, additional power leads 114 as shown in FIG. 1 may be directed from the electric motor 100 and, in the example of the three-phase motor, an additional three power leads may be included. In addition, in the example of a three-phase motor, the switching device 156 and an additional lead may be included for each of the three phases 136 included with the electric motor 100.

Figure 4:
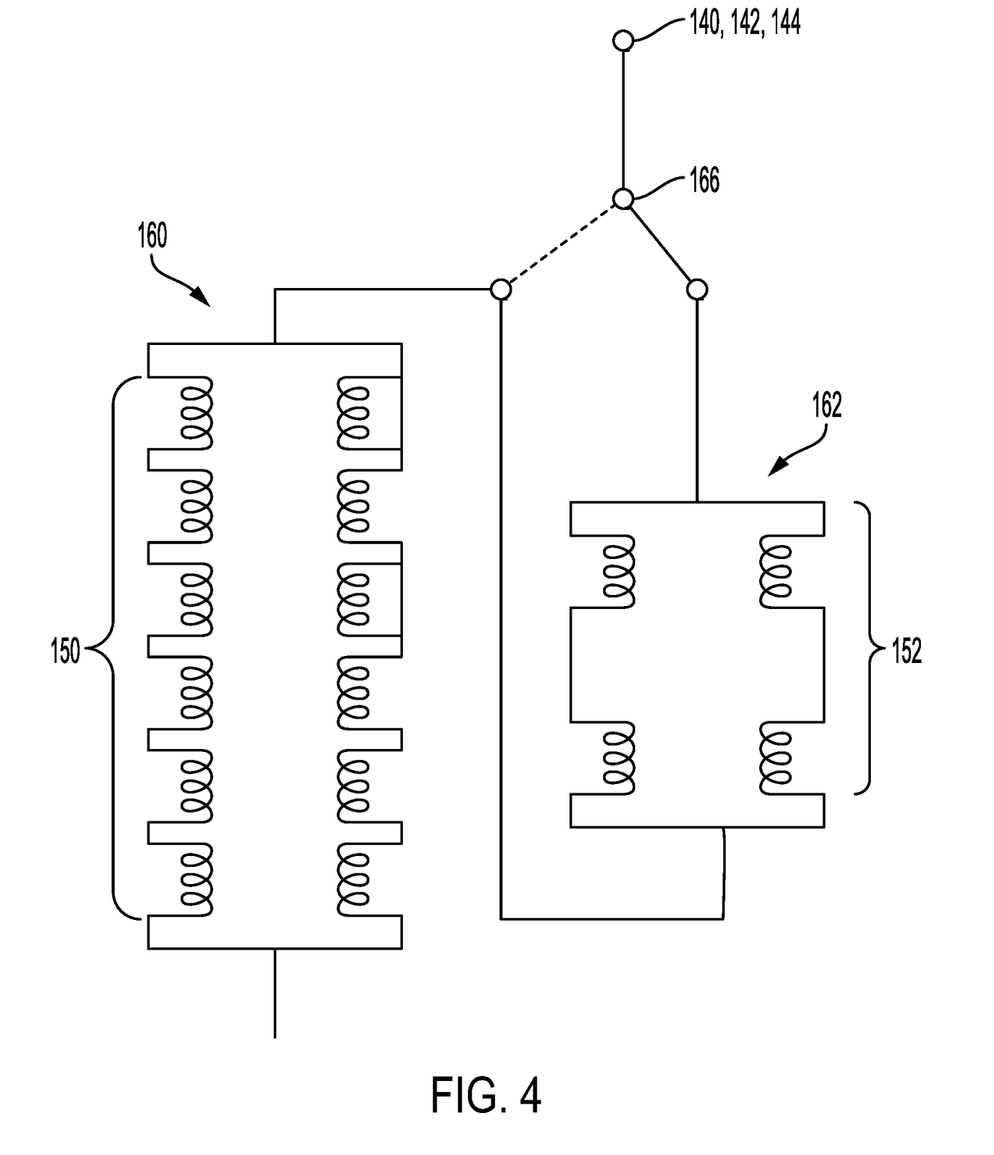
FIG. 4 is a schematic representation of another arrangement of a selectively reconfigurable arrangement of coils to alternatively produce high flux state and rated flux state in accordance with the disclosure.

Referring to FIG. 4, there is illustrated another winding pattern for a phase 136 of the electric motor 100 that is arranged to implement both a rated flux configuration when the electric motor is operating at synchronous speed and a high flux configuration when starting from standstill or a locked rotor condition. The example illustrated in FIG. 4 can be implemented where the stator 118 has many teeth and slots such that each phase 136 has several permanent coils 150 and bypass coils 152. The permanent coils 150 can be arranged in a first parallel circuit 160 in which permanent coils are evenly allocated to one of the two parallel branches. The bypass coils 152 can also be arranged in a second parallel circuit 162 in which the bypass coils are evenly allocated to one of the two parallel braches. The first parallel circuit 160 and the second parallel circuit 162 can be arranged in series with each other. The first and second parallel circuits 160, 162 can also be selectively connected to the respective one of the first, second, and third phase conductors 140, 142, 143 via the switching device 166.

To implement the rated flux configuration, the switching device 156 can be set so that the phase conductors 140, 142, 144 are directly connected to the second circuit 162 of bypass coils 152 upstream of the first circuit 160 so that all coils of the phase 136 receive full line power including full line voltage and current. To implement the high flux configuration, the switching device 160 taps directly to the first circuit 160, thereby bypassing the second circuit 162, and the respective one of the first, second, and third phase conductors 140, 142, 144 directs full line current to the permanent coils 160 increasing the magnetic flux generated therein. This setting for the switching device 166 is indicated by the dashed line configuration. The foregoing winding pattern enables further redirection of the current through the phase 136 through the inclusion of the first and second parallel circuits 160, 162 to improve electrical characteristics and operation of the electric motor 100.

Figure 5:
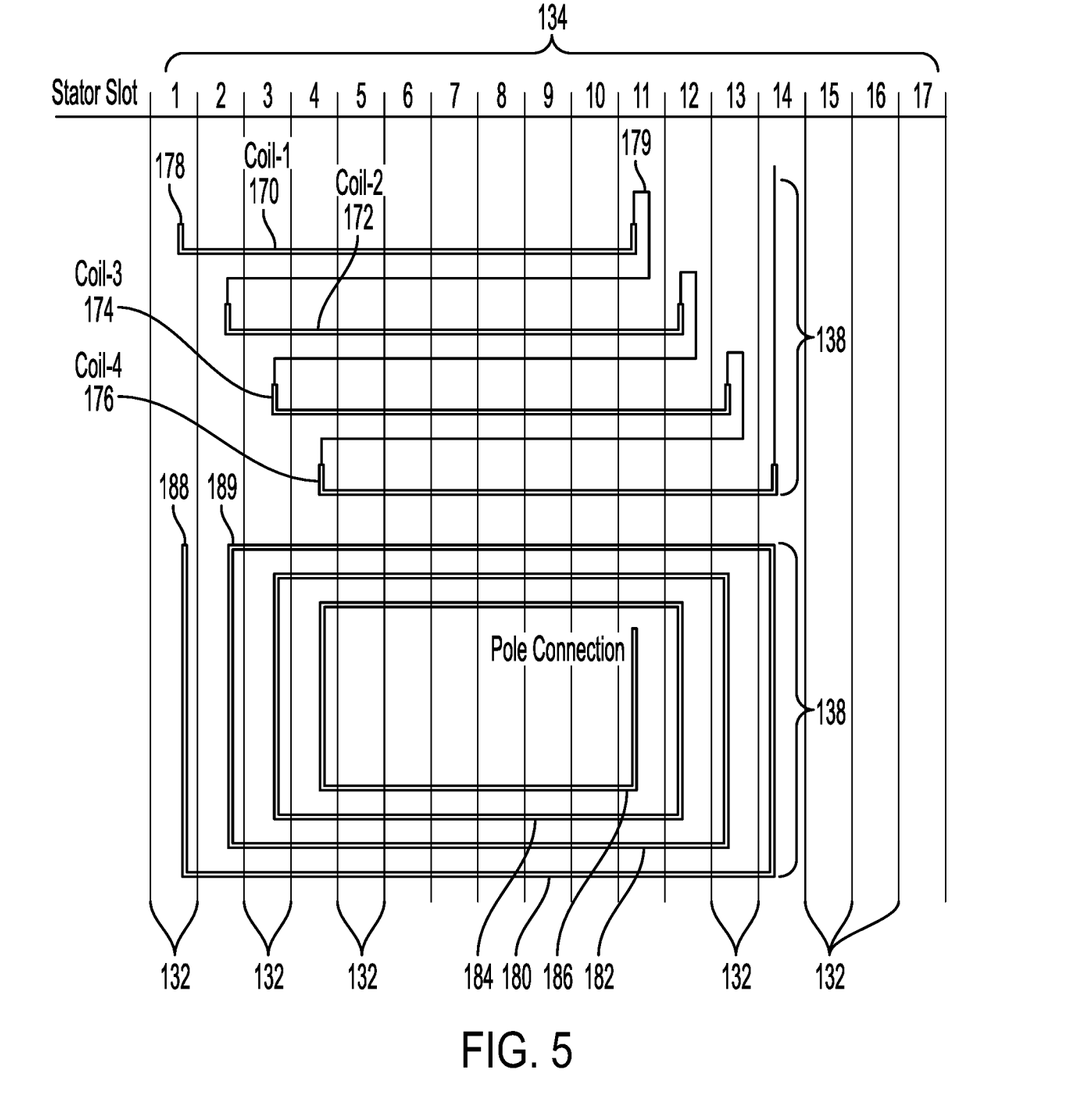
FIG. 5 is a schematic representation of a lap wound arrangement and a concentric wound configuration for the stator windings of the electric motor in accordance with the disclosure.

The disclosure can be implemented with various winding patterns that have been developed in the art for forming and arranging the phases and phase groups. Referring to FIG. 5, there is a graphic representation of two winding patterns including a "lap winding" and a "concentric winding." In a lap winding pattern, shown toward the top of FIG. 5, one side of each coil that makes up a phase group 138 will be positioned at the bottom of a particular stator slot 134 while the other side will be positioned at the top of another stator slot circumferentially located several stator slot positions away. The "side" of a coil may be the series of winding half turns aligned in the same axial direction of the plurality of winding turns that form the coil. Bottom and top of the stator slot 134 may refer to the radial depth (or height) of the stator slot disposed into the stator core. The coil may be wound around one or more stator teeth 132 (represented by vertical lines) and each coil in the phase groups should encompass the same number of stator teeth. Moreover, the respective sides of every coil, or series of winding half turns, will be separated by and encompass the same number of adjacent stator slots 134. Thus, the individual coils of a phase group 138 overlap each other in the stator slots 134 included within the arc that defines the phase group 138.

Because each phase group 138 includes multiple coils, the voltage applied to the phase groups is distributed among the plurality of coils in the group. The distribution factor ("$K_d$") represents the ratio of the vector sum of the voltage if all conductive windings are distributed among the plurality of coils allocated in each phase group, as determined by the phase and pole numbers of the electric motor, compared with the vector sum of the voltage if all conductive windings are assumed concentrated into a single coil. The distribution factor $K_d$ represents the ratio of the voltage if all the turns of a group are concentrated into a single coil compared to the vector sum if the turns are distributed over the coils of a 60° phase belt.

$$K_d = \frac{\text{Vector resultant voltage of distributed coils}}{\text{Vector resultant voltage of a single concentrated coil}} \quad \text{Eqn. 1}$$

The resultant voltage of a single concentrated coil can be determined from:

$$R_{VCC} = V_C (\text{\# coils per phase group}) \quad \text{Eqn. 2:}$$

Where $V_C$ is the voltage of each coil of the phase group.

The resultant voltage of the distributed coils ($R_{VCD}$) is the vector added sum of the individual coils. Assuming the individual coils are distributed within a specific band or belt (referred to as a phase belt) of the 360° cycle of alternating current, for example, 60° electrical degrees in the case of a four pole, three phase, 48 slot motor, the resultant voltage $R_{VCD}$ is:

$$R_{VCD} = V_C(1\angle 15 + 1\angle 30 + 1\angle 45 + 1\angle 60)  \quad \text{Eqn. 3:}$$

In the example of the electric motor described herein, where each phase group 138 includes four coils, the windings that comprise the coils may be set out as illustrated in FIG. 5. For example, a first coil 170 of the phase group 138 may encircle ten stator teeth, and thus the coil sides are located in stator slot no. 1 and stator slot no. 11. The span or distance between stator slot no. 1 and stator slot no. 11 can be referred to as the throw or pitch of the coil. The second coil 172 may be circumferentially offset by one stator slot 134 so that the coil sides are located in stator slot no. 2 and stator slot no. 12 respectively. Similarly, the third coil 174 can be offset one stator slot 134 to encompass stator slot nos. 3-13 and the fourth coil 176 can be offset one stator slot 134 to encompass stator slots nos. 4-14.

The throw or pitch of the coil can be used to calculate a pitch factor ("$K_p$") which relates the number of stator teeth the coil actually encircles with the number of stator teeth that can theoretically be allocated to the phase groups 138 of the electric motor. For a four pole electric motor having forty-eight stator teeth:

$$K_p = \sin(\text{teeth per coil}/(48 \text{ teeth}/4 \text{ poles})) = \sin(\text{teeth per coil}/12) \quad \text{Eqn. 4:}$$

To switch the motor between the rated flux configuration during synchronous operation and the high flux operation at startup, one of first, second, third, or fourth coils 170, 172, 174, 176 can be designated as the bypass coil and can be selectively disconnected from the respective phase conductor 140, 142, 144 and isolated from the power source. For example, phase group 138 can normally be directly connected to the respective phase conductor 140, 142, 144 at a primary position 178 at the start of the first coil 170, so that the second, third, and fourth coils 172, 174, 176 are connected in series to the first coil receive full line power including full line current. To switch to the high flux configuration, the respective phase conductor 140, 142, 144 can be tapped to a tap position 179 and directly connected with the second, third, and fourth coils 172, 174, 176 and thereby bypass the first coil 170. Accordingly, only the second, third, and fourth coils 170, 172, 174 receive fully line current causing them to generate a larger magnetic flux.

If the number of winding turns that comprise a coil is equal among the first, second, third, and fourth coils 170, 172, 174, and 176, then bypassing the first coil 170 should reduce the quantity of conductive windings of the phase group by 25% and result in a corresponding increase in the full line power directed to the remaining 75% of conductive windings in the remaining three coils. However, the coils of the phase group 138 may include different numbers of winding turns, referred to as turns-per-coil ("TPC"), which may affect the change in magnitude of magnetic flux generated per coil between the rated flux configuration and high flux configuration. This is because the magnetic flux produced is proportional to the number of winding turns included in a coil.

For example, the phase group 138 may have a TPC pattern of 5-4-4-4, meaning the first coil 170 includes five winding turns and the second, third, and fourth coils 172, 174, 176 each include four winding turns. If the first coil 170 is designated as the bypass coil, isolating and bypassing the first coil will have a correspondingly larger effect on the increase of magnetic flux in the high flux configuration by removing a greater of winding terms from the phase group 138. By way of example only, the ratio of the flux boost between the rated flux and high flux configurations may be 1.385.

If the phase group 138 has a TPC pattern of 4-5-4-4, meaning the second coil 172 includes five winding turns and the first coil 170 includes four winding turns (along with the second and third coils 174, 176), then bypassing the first coil 170 has a more limited effect because the number of winding turns per coil that have been isolated from full line power are relatively fewer. By way of further example, the ratio of the flux boost between the rated flux and high flux configurations may be 1.285. It will be appreciated that different TPC patterns can be employed to produce different flux ratios.

Based on the pitch factor $K_P$, distribution factor $K_d$, TPC, and other characteristics of the electric motor, a theoretically equivalent circuit can be determined that converts these characteristics into the effective series conductor per phase of the electric motor, in which the electric motor is conceptualized as a plurality of conductors connected in series. The effective series conductors per phase can be determined as:

$$\textit{Eff}\text{.Series Conductors per Phase} = \frac{2 \times (\text{Turns/coil}) \times (\text{slots/phase}) * (Kp) * (Kd)}{\text{Number of parallel circuits}} \quad \text{Eqn. 5}$$

According to the above equation, and as indicated by the above discussion of winding turns per coils and the magnetic flux produced per coil, increasing the TPC or turns per coil will increase the effective series conductors per phase.

Referring to the bottom of FIG. 5, in the concentric winding pattern, the coils within the phase group 138 are organized concentrically such that the sides of each coil are separated by a different number of slot positions. For example, the first coil 180 may be the outermost coil and may encircle fourteen stator teeth. To assume a concentric position, the sides of the first coil 180 can located in stator slot no. 1 and stator slot no. 14. The second coil 182 can be disposed concentrically inward of the first coil 180 and can be wound around eleven stator teeth so that the sides of the second coil are located in stator slot nos. 2 and 13. Likewise, the third coil 184 can be wound inward of a smaller number of stator teeth 132 with its coil sides located in stator slot nos. 3 and 11, and the concentrically inward most fourth coil 186 can have its coil sides located in stator slot nos. 4 and 11.

Because the coil pitch differs between the first, second, third, and fourth coils 180, 182, 184, 186, and assuming the same number of turns-per-coil per coil, each coil includes a different winding turns of differing lengths, which increases from the concentrically innermost forth coil 186 to the concentrically outermost first coil 180. Accordingly, designating different coils in the concentric winding pattern as the bypass coil can alter the flux ratio between the rated flux configuration and the high flux configuration of the electric motor. For example, in the rated flux configuration, the first, second, third, and fourth coils 180, 182, 184, 186 of the phase group 138 can be electrically connected in series, with the first coil 180 being directly connected to the respective one of the first, second, or third phase conductors 140, 142, 144 at a primary position 188. All four coils therefore receive full line power. If the first coil 180 is designated as the bypass coil, the first coil can be bypassed by directly connecting the third coil 184 at a tap position 189 so that only the second, third and fourth coils 184, 182, 180 receive full line power. Because the magnetic flux varies inversely with the number of coils in the series circuit, electrically disconnecting the bypass coils increases the generated magnetic flux.

Ideally, a lap winding pattern and a concentric winding pattern for the same sized electric motor would have the same starting and performance characteristics; however, the geometric differences between the lap and concentric patterns results in certain performance differences. To evaluate and reduce those differences, the equation for the effective series conductors per phase described above can be used. In particular, during design of the electric motor, the variables for the equation can be determined for both the lap winding pattern and the concentric winding pattern and adjusted until equivalence in the performance characteristics is obtained.

Because the outmost first coil 180 includes a greater of winding turns than the second, third, and fourth coils 182, 184, 186, bypassing the first coil has a substantially greater effect on the flux boost between rated flux and high flux operation. In an example, to better balance the effect of bypassing certain coils in the concentric winding pattern, the number of winding turns per coil, or TPC, can be varied among the first, second, third, and fourth coils 180, 182, 184, 186. For example, the phase group 138 can have a TPC pattern of 4-5-4-4 meaning the second coil 182 includes five winding turns and the first, third, and fourth coils 180, 184, 186 include four turns. The increased number of winding turns associated with the second coil 182 can temper the effect of bypassing the first coil 180. Alternatively, the phase group 138 can have a TPC pattern of 5-4-4-4, thereby including five winding turns in the first coil 180 such that bypassing the first coil has an increased effect on the magnetic flux ratio when bypassed. In a further example, the location of the tap position 189 can be changed so that different coils are bypassed, such as the concentrically innermost first coil 180.

Figure 6:
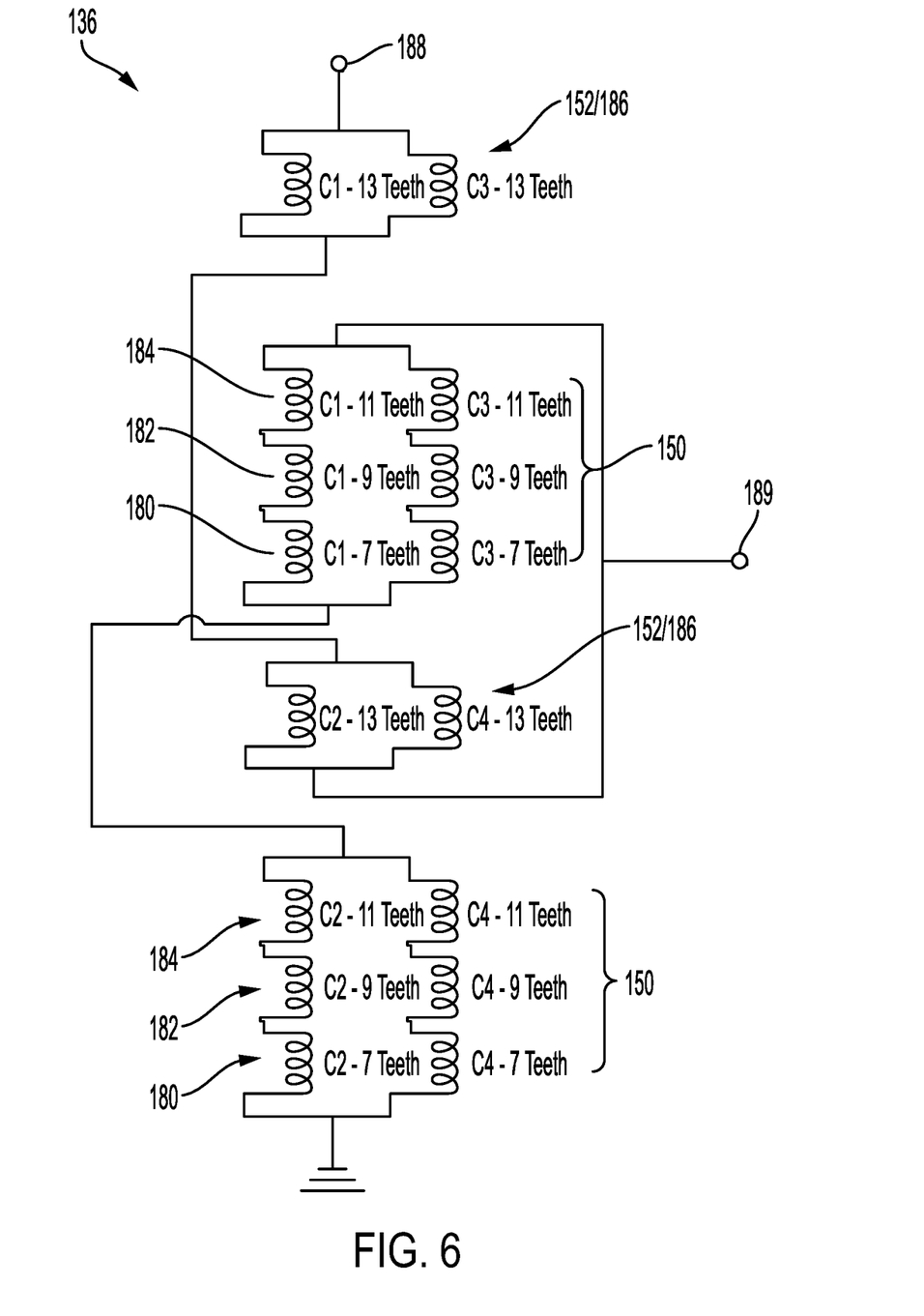
FIG. 6 is an alternative schematic representation of selectively arranging the coils of a phase using different power leads.

Referring to FIG. 6, there is illustrated an example of a phase 136 having a winding pattern to implement both rated flux and high flux configurations in a concentric winding pattern. The phase 136 may include a total of sixteen coils and includes both permanent coils 150 arranged to continuously receive full line power and bypass coils 152 that may be selectively isolated and cut from the full line power source. To realize the concentric winding pattern, the bypass coil 152 correspond to the concentrically outermost first coil 180 and the permanent coils 150 may correspond to the concentrically inwards second, third, and fourth coils, 182, 184, 186 described above with respect to FIG. 5.

Accordingly, the four coils that correspond to the bypass coils 152 of the phase 136 are wound around thirteen stator teeth 132 and are located in stator slot nos. 1 and 14. Likewise, proceeding concentrically inwardly, the four permanent coils 150 in the phase 136 corresponding to the second coil 182 of the concentric pattern are wound around eleven stator teeth 134 and are located in stator slot nos. 2 and 13; the four permanent coils 150 of the phase 136 corresponding to the third coil 184 of the concentric pattern are wound around nine stator teeth 134 and are located in stator slot nos. 3 and 12; and the four permanent coils 150 of the phase 136 corresponding to the fourth coil 186 of the concentric winding pattern are wound around seven stator teeth 134 and are located in stator slot nos. 4 and 11.

Similar to the winding pattern of FIG. 4, the phase 136 of FIG. 6 can be arranged in different parallel and series circuits. To implement the rated flux configuration, the primary position 188 via which the phase 136 connects to a respective one of the first, second, or third phase conductors 140, 142, 144 is located electrically proximate the first coils 180 corresponding to the bypass coils 152. Both permanent and bypass coils 150, 152 of the phase 136 and the first, second, third, and fourth coils 180, 182, 184, and 186 of the concentric winding pattern receives full line power.

To implement the high flux configuration, the respective one of the first, second, or third phase conductors 140, 142, 144 is tapped to the taped position 189 that is electrically proximate to the second coils 182 of the concentric winding pattern. Accordingly, only the second third, and fourth coil 182, 184, 186 corresponding to the bypass coils 150 and arranged in series receive full line power with the first coils 180 bypassed.

Figure 7:
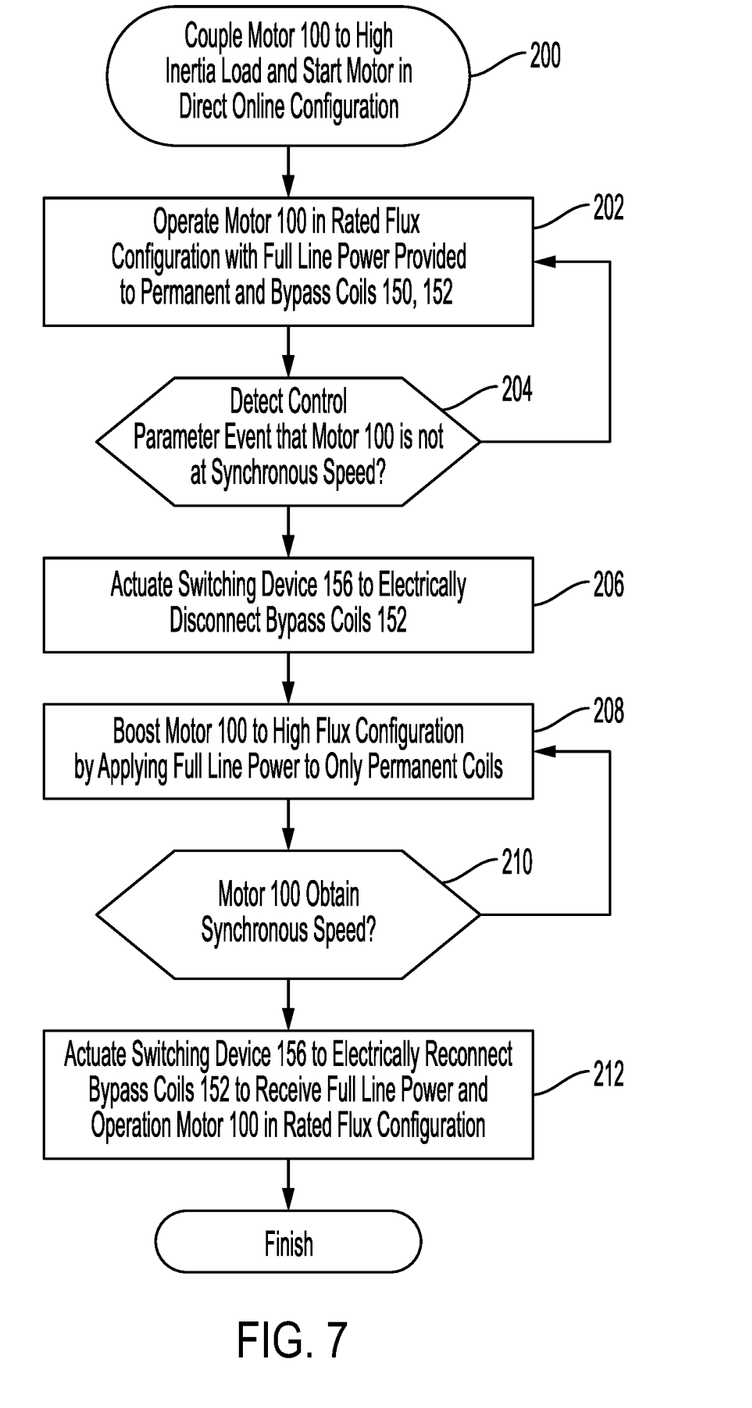
FIG. 7 is a flow diagram of an exemplary method of selectively configuring the coils of the electric motor between a high flux and a rated flux configuration at startup.

Referring to FIG. 7, there is illustrated an exemplary process by which the electric motor 100 can synchronize a high inertia load to which the motor is coupled from a standstill condition in accordance with the disclosure. As described, the electric motor 100 may be a synchronous poly-phase motor with a plurality of magnetic poles with a rotor cage. In an initial starting step 200, the electric motor 100 is coupled to the high inertia load and started in a direct online ("DOL") configuration whereby the full rated power from the power source is applied to the permanent coils and the at least one bypass coil of the electric motor that may be electrically connected in series. During this time, in rated flux operation 202, the electric motor 100 operates in a rated flux condition with alternating current distributed to both the permanent and bypass coils 150, 152 such that all coils generate magnetic fields of generally equal magnetic flux.

To generate a flux boost as the electric motor attempts to reach synchronous speed, the electric motor can be reconfigured from the rated flux configuration to the high flux configuration by electrically disconnecting the bypass coils. Disconnecting the bypass coils can be accomplished with a switching device 156 that is operatively associated with the power leads to electric motor. To actuate the switching device 156, a first detection step 204 detects a control parameter that is utilized to actuate the switching device 156 in an actuation step 206 and bypass the bypass coils 152.

The switching device 156 can be timer that is configured to actuate after a predetermined acceleration time during which the electric motor attempts to accelerate to synchronous speed. The switching device 156 can switch from directly connecting the bypass coils to the power source to a tapped position in which only the permanent coils are directly connected to the power source. Alternatively, the switching device 156 may be a relay switch that can be actuated by a control parameter. The control parameter can be the rotational speed of the electric motor 100. For example, if the motor is operating below synchronous speed, the relay switch 156 can actuate to selectively operate the motor in the high flux configuration. In another example, the control parameter can be the current drawn by the electric motor 100 at startup. If the electric motor 100 is operating below synchronous speed, the inrush current drawn may be higher than rated current, which can be utilized as the control signal to actuate the relay switch.

In the high flux configuration during high flux operation 208 with the bypass coils 152 disconnected from and bypassed by the power source, the full line power is only delivered to the permanent coils 150. Because the magnetic flux generated by the coils, for example, per phase group, varies inversely with the number of coils connected in series, reducing the total number of coils increases the magnitude of the generated magnetic flux. This creates the flux boost of the rotating magnetic field that can increase the magnetic attraction of the permanent magnetics in the rotor that in turn increases the output torque of the electric motor 100. The additional torque due to the flux boost can be used to synchronize movement of the high inertia load to which the electric motor is coupled. In possible examples, the flux boost generated in the high flux configuration can be for example 1.3 to 1.5 times the rated flux generated in the rated flux configuration.

When the electric motor achieves synchronous speed, which can be determined in a synchronization detection step 210 or after a predetermined time period, the electric motor can be reconfigured to again operate in the rated flux configuration since the additional torque generated in the high flux configuration is no longer necessary to initiate movement of the high inertia load. This can be accomplished in a second actuation step 212 in which the switching device 156 is actuated to directly connect the bypass coils 152 with the power source. Because the bypass coils 152 are connected in series with the permanent coils 150, all coils in the motor receive full line power and generate magnet fields of reduced magnetic flux. In the example where the switching device 156 is a timer, a predetermined synchronization period may be used as a control parameter to actuate the switching device. The synchronization period and the acceleration period described above can be determined empirically. In the example where the switching device is a relay switch, the control signal can be rotational speed of the electric motor, which would be about equal with the synchronous speed, or can be the electric current drawn, which would fall to the rated current.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

The invention claimed is:

1. A poly-phase synchronous electric motor comprising:
a rotor including a motor shaft delineating a rotational axis
a stator concentrically disposed about the rotor, the stator including a stator core and a plurality of radially arranged stator teeth concentrically separated from each other by a plurality of stator slots disposed radially into an inner cylindrical stator surface of the stator core;
a plurality of coils formed from conductive windings each wound around one or more of the plurality of stator teeth, the plurality of coils arranged in a plurality of phases each operatively associated with an electrical phase, wherein at least one phase includes one or more permanent coils and at least one bypass coil, the plurality of coils further arranged in a concentric winding pattern with a concentrically outermost coil of the concentric winding pattern is the at least one bypass coil;
a primary position that electrically connects with the permanent coils and bypass coils to deliver full line power thereto during a rated flux condition,
a tapped position that electrically connects with only the permanent coils to deliver full line power thereto during a high flux condition characterized by an increased magnitude of magnetic flux compared to the rated flux condition, and
a switching device configured to selectively switch between communicating power to the tapped position and the primary position to bypass the bypass coils.

2. The electric motor of claim 1, wherein the permanent coils of the phase are electrically connected in series.

3. The electric motor of claim 2, wherein the at least one bypass coil of the phase is electrically connected to the permanent coils when not bypassed.

4. The electric motor of claim 1, wherein the one or more permanent coils and the at least one bypass coil have different turns-per-coil with respect to the conductive windings included therein.

5. The electric motor of claim 1, wherein the electric motor is a three-phase motor with three phases and the plurality of coils per phase is sixteen with twelve permanent coils and four bypass coils.

6. The electric motor of claim 1, wherein the electric motor is four pole motor and the plurality of coils are further arranged in a plurality of phase groups each with three permanent coils and one bypass coil.

7. The electric motor of claim 1, wherein the switching device is a timer configured to switch from the primary position to the tapped position after a predetermined acceleration period and to switch from the tapped position to the primary position after a predetermined synchronization period.

8. The electric motor of claim 1, wherein the switching device is relay switch and a control parameter for switching the relay switch is selected from the group comprising motor speed and current draw.

9. The electric motor of claim 1, wherein the rotor is a caged rotor permanent magnet type including an inductive rotor cage.

10. A method of electric motor operation comprising:
coupling a motor shaft of a poly-phase synchronous electric motor to an inertia load, the electrical motor including a plurality of coils arranged in at least one phase;
applying full line power to the plurality of coils during a rated flux condition from motor standstill;
electrically disconnecting at least one bypass coil of the plurality of coils of the at least one phase from the full line power with a switching device;
applying full line power to one or more permanent coils of the plurality of coils of the at least one phase during a high flux condition characterized by an increased magnitude of the magnetic flux compared to the rated flux condition; and electrically reconnecting the at least one bypass coil of the plurality of coils of the at least one phase with the switching device after obtaining synchronous operation of the electric motor to return to the rated flux configuration and to apply full line power to the at least one bypass coil.

11. The method of claim 10, wherein the step of electrically disconnecting the at least one bypass coil occurs after a predetermined acceleration period.

12. The method of claim 10, wherein the step of electrically disconnecting the at least one bypass coil occurs after detecting a control parameter that is selected from the group comprising motor speed and current draw.

13. The method of claim 10, wherein a difference between the high flux condition and the rated flux condition determines a flux boost of the electric motor.

14. The method of claim 10, wherein the plurality of coils is arranged on one of a lap winding pattern and a concentric winding pattern.

15. A synchronous electric motor comprising:
- a rotor including a motor shaft delineating a rotational axis;
- a stator concentrically disposed about the rotor, the stator including a stator core with a plurality of radially arranged stator teeth concentrically separated from each other by a plurality of stator slots disposed radially into an inner cylindrical stator surface of the stator core;
- a plurality of coils formed from conductive windings each wound around one or more of the plurality of stator teeth, the plurality of coils including one or more permanent coils and at least one bypass coil that are electrically connected in series;
- a primary position that electrically connects the bypass coils and the permanent coils to a power lead to deliver full line power thereto during a rated flux condition;
- a tapped position that electrically connects only the permeant coils to the power lead to deliver full line power thereto during a high flux condition characterized by an increased magnitude of magnetic flux compared to the rated flux condition; and
- a switching device configured to selectively switch between a high flux condition connecting the permanent coils to the power lead to bypass the bypass coils if the electric motor is operating below synchronous speed, and a rated flux condition reconnecting the primary position to the power after the electric motor achieves synchronous speed.

16. The electrical motor of claim 15, wherein the plurality of coils in the phase is arranged in a lap winding pattern.

17. The electrical motor of claim 16, wherein the plurality of coils in the phase each have the same coil pitch as determined by the number of stator teeth the coils are wound around.

18. The electrical motor of claim 17, wherein the one or more permanent coils and the at least one bypass coil have different turns-per-coil with respect to the conductive windings included therein.

19. The synchronous electric motor of claim 15, wherein the switching device is selected from the group comprising a timer configured to switch to the rated flux condition after a predetermined synchronization period, and a relay switch configured with a control parameter for switching the relay switch, wherein the control parameter is one of motor speed or current draw.

20. The synchronous electric motor of claim 15, wherein the plurality of coils are arranged in a concentric winding pattern and a concentrically outermost coil of the concentric winding pattern is the at least one bypass coil.

* * * * *